United States Patent
Freeland

[19]

[11] Patent Number: 5,848,471
[45] Date of Patent: Dec. 15, 1998

[54] WINDSHIELD WIPER RECONDITIONING DEVICE

[76] Inventor: Jay Freeland, 9890 Scatterwood La., Port Orchard, Wash. 98366

[21] Appl. No.: 675,548

[22] Filed: Jul. 3, 1996

[51] Int. Cl.⁶ .................................................. B26B 29/06
[52] U.S. Cl. .............................................. 30/280; 30/294
[58] Field of Search ............................. 30/278, 280, 294, 30/317, 169

[56] References Cited

U.S. PATENT DOCUMENTS

| | | | |
|---|---|---|---|
| 1,753,086 | 4/1930 | Niedomanski | 30/280 X |
| 1,770,336 | 7/1930 | Grüber . | |
| 2,635,334 | 4/1953 | Tvrzicky | 30/169 |
| 2,759,544 | 8/1956 | De Vries | 30/294 |
| 2,881,520 | 4/1959 | Mito | 30/280 |
| 3,611,571 | 10/1971 | Belling | 30/280 |
| 3,644,993 | 2/1972 | Chupp | 30/280 |
| 3,886,657 | 6/1975 | Fabian | 30/294 |
| 4,334,448 | 6/1982 | Messerschmitt | 83/171 |
| 4,434,554 | 3/1984 | Korbelak | 30/280 X |
| 4,497,233 | 2/1985 | Papalexis et al. | 83/873 |
| 4,524,516 | 6/1985 | Weichard | 30/294 X |
| 4,604,802 | 8/1986 | Samuelsson | 30/124 |
| 4,785,699 | 11/1988 | Oblinger et al. | 83/425 |
| 5,044,078 | 9/1991 | Heaton, Sr. | 30/280 X |
| 5,058,274 | 10/1991 | Smith | 30/169 |
| 5,235,751 | 8/1993 | Landgraf | 30/280 X |
| 5,251,351 | 10/1993 | Klotz | 7/100 |
| 5,359,776 | 11/1994 | Glazar | 30/169 |
| 5,377,563 | 1/1995 | Weeks | 76/86 |

*Primary Examiner*—Eugenia Jones
*Attorney, Agent, or Firm*—Seed and Berry, LLP

[57] ABSTRACT

A hand-held windshield wiper reconditioning device that has a body shaped and sized to be operated by a hand of a user. In an embodiment of the reconditioning device, a pair of opposing guide surfaces extends between a front face and a rear face of the body. The guide surfaces are shaped to define a channel through the body with a cross-sectional profile that substantially corresponds to a cross-sectional shape of a wiper blade. A cutting blade is mounted across an upper portion of the channel at an acute angle with respect to the cutting path. In operation, the channel positions the wiper blade to maintain a constant spatial relationship between the wiper blade and the body. As the body moves along the wiper blade, the cutting blade cleanly slices material from the tip of the wiper at a substantially constant depth along the whole length of the wiper.

13 Claims, 5 Drawing Sheets

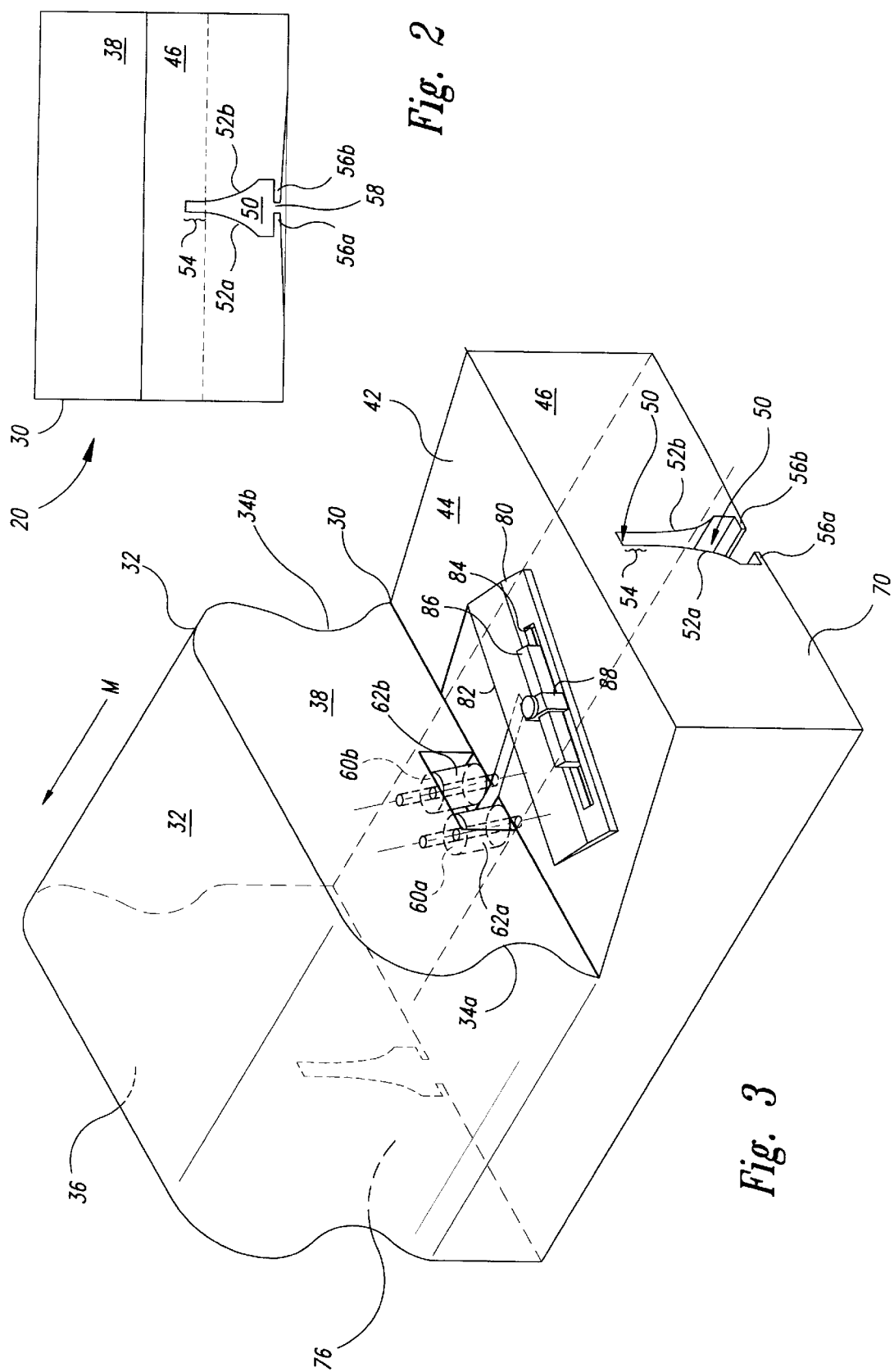

WINDSHIELD WIPER RECONDITIONING DEVICE

TECHNICAL FIELD

The present invention relates to hand-held wiper blade reconditioning devices that refurbish used wiper blades while the wiper blade is mounted to a vehicle.

BACKGROUND OF THE INVENTION

Wiper blades are commonly used on vehicles to clean water, dirt, snow and other substances from windshields and rear windows. Wiper blades are generally an elongated rubber member that has a mounting section and a wiping section. The mounting section has lower and upper pairs of opposing grooves extending along the sides of the wiper blade. The lower grooves receive flanges or tabs of a wiper arm to attach the wiper blade to the wiper arm, and the upper grooves allow the wiper blade to flex during operation. The wiping section generally has opposing sides that converge towards each other from the mounting section to a narrow, elongated edge that runs along a longitudinal axis of the wiper blade. The edge is preferably a uniform, sharp surface that presses against the window to remove water and other substances from the window as the wiper blade is swept from side to side.

One problem with wiper blades is that the surface of the edge deteriorates until the edge becomes too rough to effectively remove water from the window. Once the edge deteriorates, the wiper blades generally produce streaks across the window that substantially impair the ability to see clearly through the windows. Therefore, it is often necessary to either replace worn wiper blades with new wiper blades or recondition the edge of worn wiper blades.

U.S. Pat. No. 5,359,776 discloses a device for restoring the cleaning properties of worn vehicle windshield wiper blades. The device has a body with a rectilinear notch to accept the working edge of a windshield wiper blade and a sharp steel blade recessed in the notch. The notch is shallow so that only a portion of the wiper blade with a substantially rectilinear cross section is received in the notch. In operation, a user positions the sharp steel blade perpendicularly to the surface of the working edge and transversely to the longitudinal axis of the wiper blade. The user then draws the device along the length of the windshield wiper blade.

The sharpening device disclosed in U.S. Pat. No. 5,359,776, however, is difficult to operate and it may not adequately condition a wiper blade. It will be appreciated that the resulting reconditioned wiper blade may still cause streaking to occur because the working edge may not be sharp and flat along the whole length of the wiper blade.

In light of the problems with windshield wiper blades and the problems with devices for reconditioning windshield wiper blades, it would be desirable to develop an effective and convenient hand-held windshield wiper blade reconditioning device.

SUMMARY OF THE INVENTION

The present invention is a hand-held windshield wiper reconditioning device that has a body shaped and sized to be operated by a hand of a user. In a preferred embodiment, a pair of opposing guide surfaces extend between a front face and a rear face of the body. The guide surfaces are shaped to define a channel through the body with a cross-sectional profile that substantially corresponds to a cross-sectional shape of a wiper blade. A cutting blade is mounted across an upper portion of the channel at an acute angle with respect to the cutting path. In operation, the channel positions the wiper blade to maintain a constant spatial relationship between the wiper blade and the body. As the body moves along the wiper blade, the cutting blade cleanly slices material from the tip of the wiper at a substantially constant depth along the whole length of the wiper.

The reconditioning device preferably has a number of interchangeable guide blocks that have channels with different cross-sectional profiles. The guide blocks are removably attachable to the body so that a number of wiper blades with different profiles may be reconditioned with a single reconditioning device. Additionally, the position of the cutting blade with respect to the channel is preferably adjustable to vary the depth and the location of the cutting edge in the channel. An adjustable cutting blade allows a new, sharp portion of the cutting edge to be positioned within the channel, and it also allows the cutting edge to be lowered or raised within the channel to vary the depth of the cut.

BRIEF DESCRIPTION OF THE DRAWINGS

FIG. 2 is a front view of the windshield wiper reconditioning device of FIG. 1.

FIG. 3 is an isometric view of another windshield wiper reconditioning device in accordance with an embodiment of the invention.

DETAILED DESCRIPTION OF THE INVENTION

The present invention is a hand-held wiper reconditioning device. In a preferred embodiment, a uniform, sharp edge is consistently produced along the length of a wiper blade without removing the blade or the wiper assembly from the vehicle. One important aspect of a preferred embodiment is that the reconditioning device has a pair of opposing guide surfaces that define a channel with a cross-sectional profile substantially corresponding to a cross-sectional shape of a wiper blade. The channel substantially prevents a wiper blade from twisting or bending as it is being reconditioned. Another important aspect of a preferred embodiment is that the body has a pair of opposing flanges projecting inwardly from the guide surfaces. The flanges travel within the grooves on the side of a wiper blade to maintain a constant spatial relationship between the tip of the wiper blade and the body. Still another important aspect of a preferred embodiment is that the cutting blade is mounted in the channel at an acute angle with respect to the cutting path to slice material from the tip of the wiper blade and produce a sharp, uniform edge. FIGS. 1–6, in which like reference numbers refer to like parts throughout the various figures, illustrate hand-held windshield wiper reconditioning devices in accordance with the invention.

Figure 1:
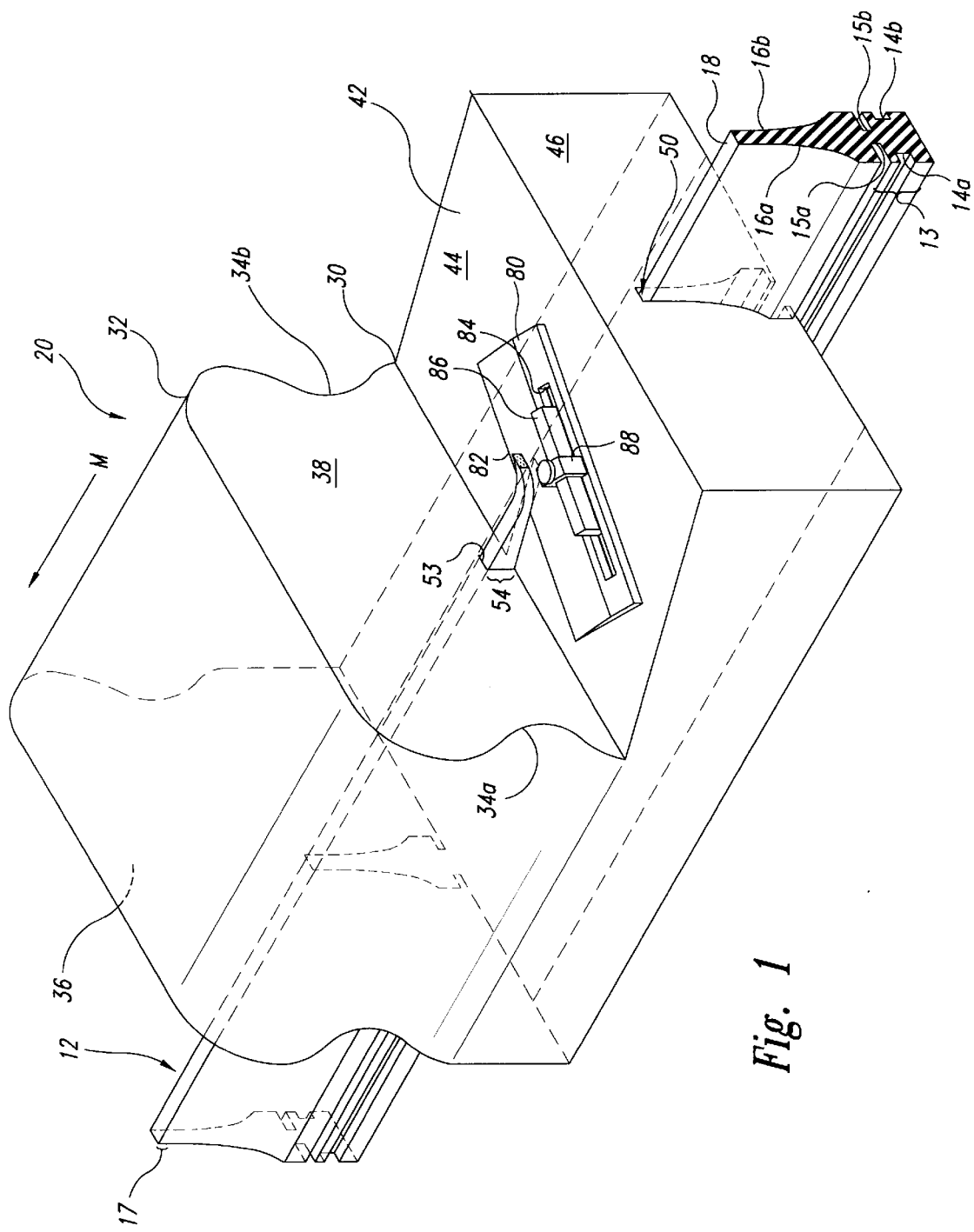
FIG. 1 is an isometric view of a windshield wiper reconditioning device in accordance with an embodiment of the invention.

FIG. 1 illustrates a wiper blade reconditioning device 20 in accordance with the invention. The reconditioning device 20 has a body 30, a channel 50 extending through the body 30 along a cutting path, and a cutting blade 80 mounted to the body 30 across an upper portion of the channel 50. The body 30 has a handle 32 with side grips 34(a) and 34(b) extending between a front face 36 and an intermediate face 38. The side grips 34(a) and 34(b) are sized and shaped to allow the reconditioning device 20 to be operated by a hand of a user (not shown). The body 30 also has a cutting blade platform 42 with a top surface 44 extending upwardly from the intermediate face 38 to a rear face 46 at the end of the body 30. The body 30 may be made from many materials including, but not limited to, metals, plastics, and wood. The body 30 is preferably made by injection molding a low friction material such as Delrin® manufactured by E. I. DuPont de Nemours Co. of Wilmington, Del. It will be appreciated, however, that the body 30 may also be made by other suitable production techniques and from other suitable materials.

Referring to FIGS. 1 and 2 together, the channel 50 extends through the body 30 between the front and rear faces 36 and 46. The channel 50 is defined by opposing guide surfaces 52(a) and 52(b), and opposing flanges 56(a) and 56(b). The guide surfaces 52(a) and 52(b) are shaped to form an opening that corresponds to the cross-sectional shape of a specific type of wiper blade. The guide surfaces 52(a) and 52(b) may be solid walls extending the full length of the channel 50 from the front face 36 to the rear face 46 of the body 30, or they may be rollers, opposing cams, and other surfaces that do not necessarily extend the full length of the channel 50. The upper portion of the channel 50 between the guide surfaces 52(a) and 52(b) defines a cutting zone 54 through which a tip region of a wiper blade edge travels during the operation of the reconditioning device 20. The cutting zone 54 of the channel 50 forms a hole 53 in the intermediate face 38 of the handle 32 and the top surface 44 of the cutting blade platform 42. The opposing flanges 56(a) and 56(b) project inwardly towards the center of the channel 50 to form a slot 58 that runs the length of the channel 50.

The channel 50 guides a windshield wiper 12 through the body 30 to maintain a constant spatial relationship between the wiper 12 and the body 30. As shown in FIG. 1, the wiper blade 12 has a mounting section 13 with a lower pair of opposing grooves 14(a) and 14(b), and an upper pair of opposing grooves 15(a) and 15(b), both of which extend along the length of the wiper blade 12. The wiper blade 12 also has a wiping section with first and second sides 16(a) and 16(b) tapering towards each other between the mounting section 13 and a tip region 17. The guide surfaces 52(a) and 52(b) of the channel 50 are shaped and sized to receive the sides 16(a) and 16(b) of the wiper 12 with a minimal amount of clearance therebetween. The minimal clearance between the body 30 and the sides 16(a) and 16(b) of the wiper blade 12 substantially prevents the wiper blade 12 from bending or twisting as the reconditioning device 20 moves along the wiper blade 12. Additionally, the flanges 56(a) and 56(b) slide through the upper pair of grooves 15(a) and 15(b) of the wiper blade 12 to substantially prevent the tip region 17 of the wiper blade from moving vertically within the cutting zone 54 of the channel 50. Thus, by providing a contoured channel 50 that has a cross-sectional profile corresponding to the cross-sectional shape of the wiper blade 12, and also by preventing vertical displacement between the tip region 17 and the cutting zone 54, the channel 50 substantially maintains a constant spatial relationship between the tip region 17 and the body 30.

The cutting blade 80 is mounted to the top surface 44 of the cutting blade platform 42. The cutting blade 80 has a sharp edge 82 extending transversely across the opening 53 and a slot 84 through which a post 86 is received. A fastener 88 connected to the post 86 attaches the cutting blade 80 to the body 30. The top surface 44 of the cutting blade platform 42 is inclined to position the cutting blade 80 at an acute angle with respect to the cutting path defined by the channel 50. The cutting blade 80 is preferably a thin, hard metal blade with an extremely sharp cutting edge 82. Suitable blades include stainless steel or titanium blades similar to those used in scalpels and razor blades. The cutting blade 80 accordingly slices the wiper blade instead of scraping the edge.

To recondition the wiper blade 12, it is positioned in the channel 50 so that the flanges 56(a) and 56(b) are received in the groove 15(a) and 15(b) of the cutter blade 12, and then the reconditioning device 20 is moved in a direction indicated by arrow M. The tip region 17 of the wiper blade 12 travels through the cutting zone 54 of the channel 50 and extends through the hole 53 in the cutting blade platform 42. As the reconditioning device 20 moves along the wiper blade 12, the cutting blade 80 slices material from the tip region 17 of the wiper blade 12 to produce a sharp edge 18 along the length of the wiper blade 12. Importantly, the side walls 52(a) and 52(b) and the flanges 56(a) and 56(b) guide the wiper blade to maintain a constant spatial relationship between the wiper blade 12 and the body 30. As a result, the cutting blade 80 slices material from the wiper blade 12 at a constant level along the length of the wiper blade 12.

One advantage of the wiper reconditioning device 20 is that it reconditions a wiper blade while the blade is attached to a car. For example, a user may recondition the wiper by lifting the wiper blade from the windshield, inserting the wiper blade in the channel while the wiper blade is attached to the wiper arm, and moving the reconditioning device along the wiper blade. Therefore, the wiper reconditioning device 20 provides a convenient, quick way of reconditioning wiper blades.

Another advantage of the wiper reconditioning device 20 is that a constant spatial relationship is maintained between the wiper blade 12 and the body 36 to produce a uniform cut along the full length of the wiper blade. Unlike existing hand-held wiper blade sharpeners, the reconditioning device 20 provides a channel that substantially prevents the wiper blade from bending or twisting so that the wiper blade is continuously aligned with respect to the cutting blade 80. Additionally, the flanges on the body hold the wiper blade at a constant vertical position to provide a uniform cut along the length of the wiper blade. Thus, compared to conventional hand-held wiper blade sharpeners, the reconditioning device of the invention produces a more uniform cut along the whole length of the wiper blade.

Still another advantage of the present invention is that the cutting blade 80 is positioned with respect to the tip of the wiper blade to cleanly slice material from the tip region. Unlike other wiper blade sharpening devices that abrade or scrape material from the wiper blade, the present invention slices material from the tip of the wiper blade. Therefore, the wiper reconditioning device of the present invention produces a clean, sharp edge to reduce streaking across the surface of a window.

In another embodiment (not shown), a plurality of channels extend through the body of the conditioning device. Each channel is defined by a separate pair of opposing guide surfaces so that each channel has a distinct cross-sectional profile with respect to the other channels. The cross-sectional profiles are selected to receive different types of wiper blades. Thus, the reconditioning device may be a universal device able to accommodate different types of wiper blades with different cross-sectional shapes and sizes.

FIG. 3 illustrates another wiper reconditioning device 120 in accordance with invention. As with the wiper reconditioning device 20 of FIGS. 1 and 2, the reconditioning device 120 has a body 30, a channel 50 extending through the body 30 from its front face 36 to its rear face 46, and a cutting blade 80 attached to the body 30 to position a sharp cutting edge 82 at a desired depth across the channel 50. The reconditioning device 120 also has first and second guide rollers 60(a) and 60(b) attached to the body 30 in front of the cutting blade 80. The guide rollers 60(a) and 60(b) have outer surfaces 62(a) and 62(b), respectively, that press against opposite sides of the tip region 17 of the wiper blade 12 (shown in FIG. 1). The guide rollers 60(a) and 60(b) operate to straighten the tip region 17 just before it engages the sharp cutting edge 82 of the cutting blade 80. Accordingly, first and second guide rollers 60(a) and 60(b) reduce bending and twisting in the wiper blade to insure that the tip region 17 is properly aligned with cutting blade 80.

Figure 4:
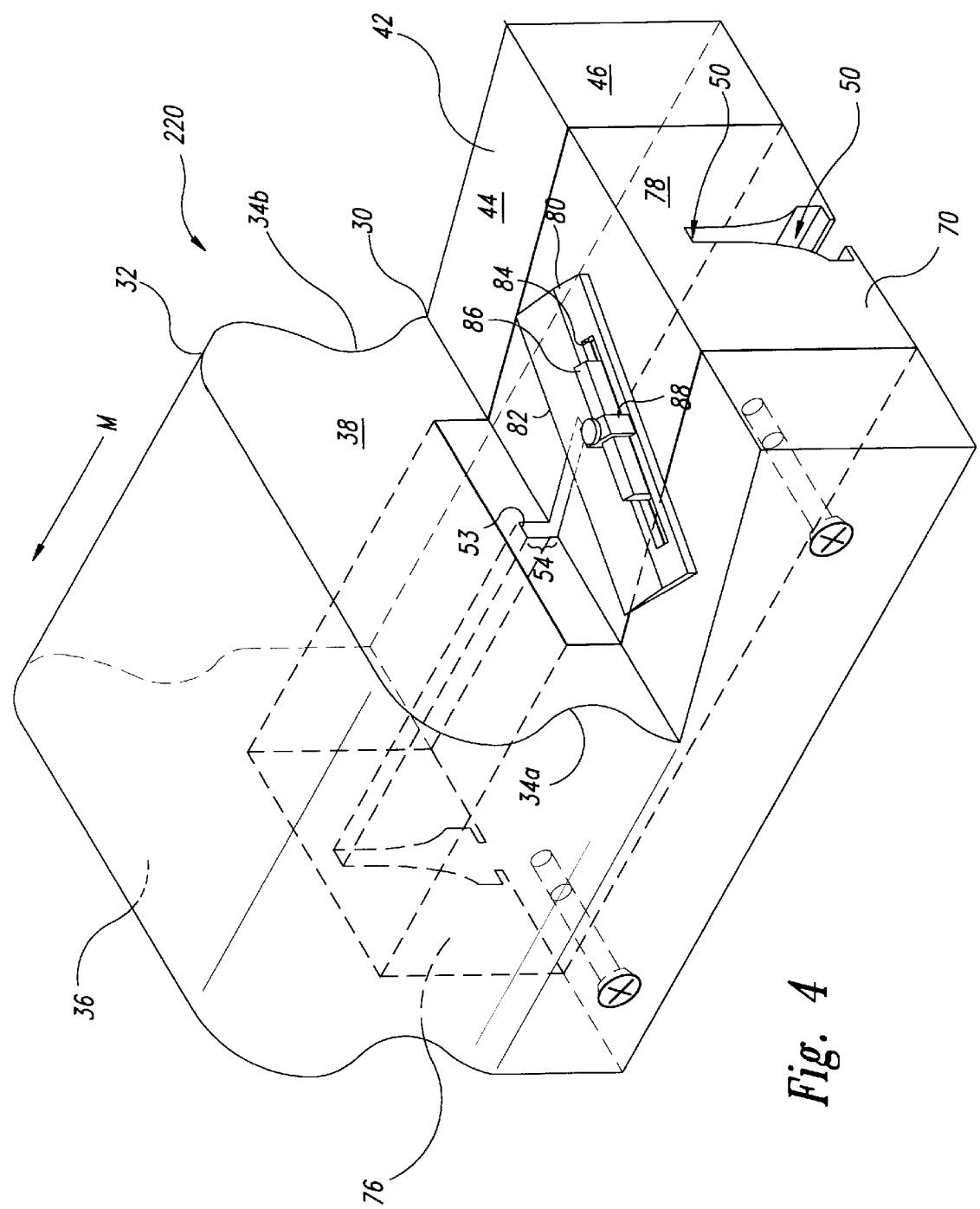
FIG. 4 is an isometric view of another windshield wiper reconditioning device in accordance with an embodiment of the invention.

FIG. 4 illustrates another wiper reconditioning device 220 in accordance with the invention. In addition to the body 30 and the cutting blade 80 shown in the wiper reconditioning device 20 of FIGS. 1 and 2, the wiper reconditioning device 220 also has an interchangeable guide member 70. The guide member 70 has a front face 76 and a rear face 78, and the channel 50 extends through the guide member 70 between the front face 76 and the rear face 78. The wiper reconditioning device 220 preferably has a number of interchangeable guide members 70 with channels that have different cross-sectional profiles to accommodate wiper blades with different shapes. The guide member 70 is releasably attached to the body 30 by any well-known fastener such as screws, releasable snaps, and other suitable devices so that one guide member 70 may be switched with another in the body 36. Thus, the wiper reconditioning device 220 is preferably made and sold as a kit with a single body 30 and a number of different guide members 70 that fit the wiper profile of several different common wiper blades.

Figure 5:
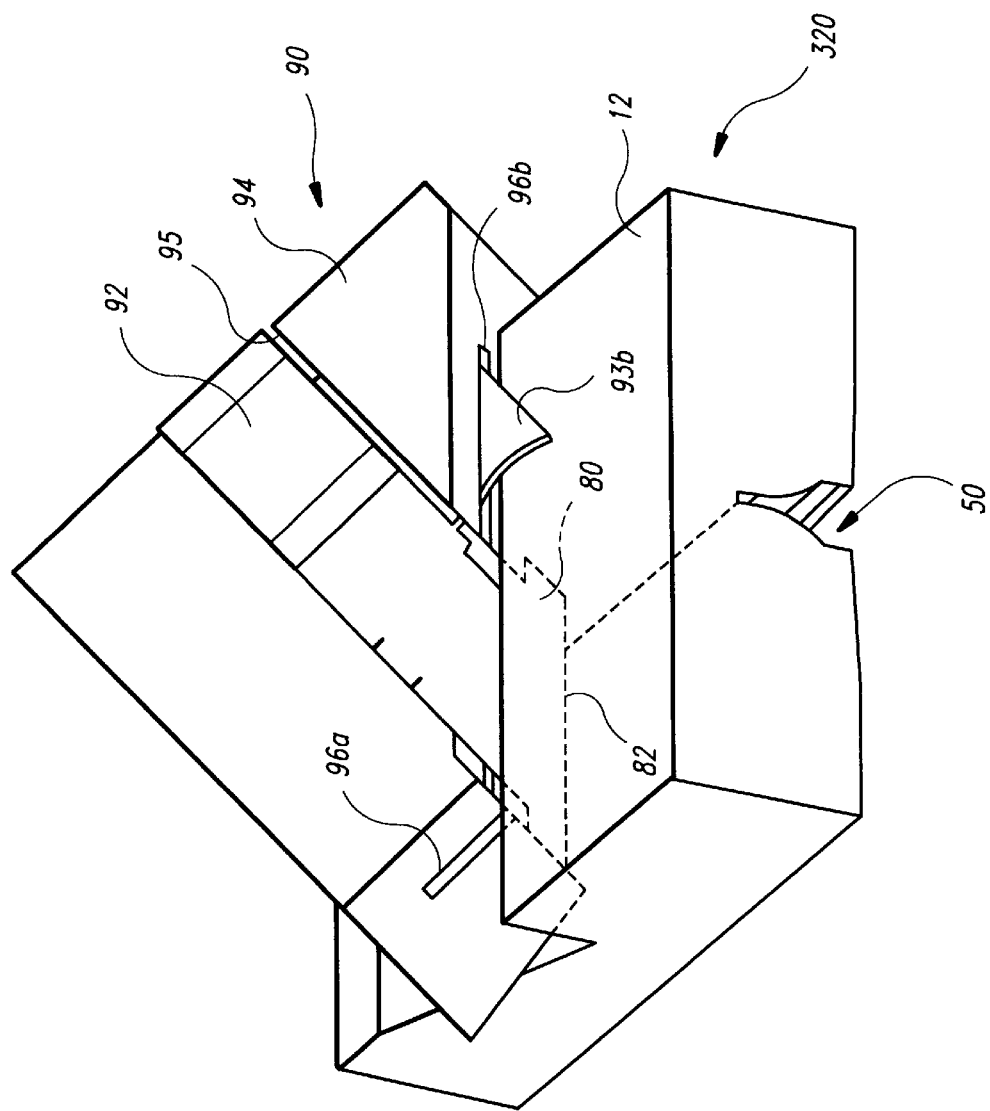
FIG. 5 is an isometric view of another windshield wiper reconditioning device in accordance with an embodiment of the invention.
Figure 6:
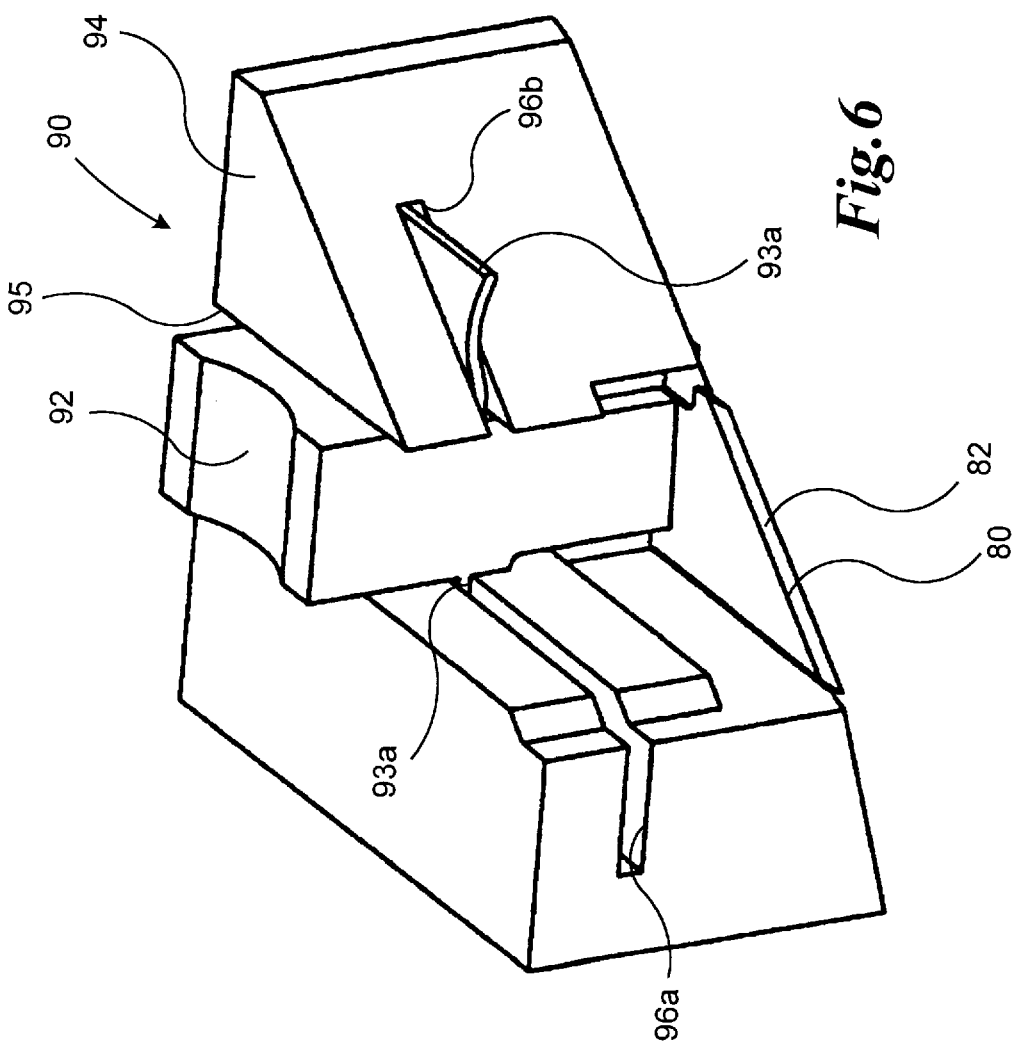
FIG. 6 is an isometric view of an adjustable cutting blade assembly in accordance with an embodiment of the invention.

FIGS. 5 and 6 illustrate another wiper reconditioning device 320 in accordance with the invention. In addition to the structure of the reconditioning device 20 of FIGS. 1 and 2, the reconditioning device 320 has an adjustable blade assembly 90 that moves the cutting blade 80 downwardly and transversely over the top surface 44 of the cutting platform 42. Referring to FIG. 6, the adjustable blade assembly 90 has a blade holder 92 with a number of arms 93(a) and 93(b), and a block 94 with a notch 95 and slots 96(a) and 96(b). The blade holder 92 is received in the notch 95, and the arms 93(a) and 93(b) of the blade holder 92 are received in the slots 96(a) and 96(b), respectively. The cutting blade 80 is attached to the bottom of the blade holder 92, and the block 94 is attached to the cutting platform 42 of the body 30 as shown in FIG. 5.

To adjust the position of the cutting blade 80, a user slides the blade holder 92 with respect to the block 94 to move the cutting blade 80 downwardly and transversely over the top surface 44 of the cutting platform 42. By moving the cutting blade transversely with respect to the top surface 44 of the cutting platform 42, a new, sharp portion of the cutting edge 82 may be positioned along the hole 53 through the cutting platform 42. Additionally, by moving the cutting blade 80 downwardly, a previously reconditioned blade may be reconditioned again because the increased depth of the sharp edge 82 allows the cutting blade 80 to remove additional material from a previously reconditioned wiper blade. It would be appreciated that other adjustable blade mechanisms may be used to move the cutting blade 80 downwardly and transversely with respect to the cutting zone 54 of the channel 50.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A hand-held windshield wiper reconditioning device, comprising:

a body having a handle, a cutting platform, and a channel extending longitudinally through the body along an axis, the handle having side grips, the cutting platform having an inclined surface extending from the handle to a rear face of the body, and the channel being defined by opposing guide surfaces extending through the body, the opposing guide surfaces being spaced apart from one another in a cutting zone to receive a tip of a wiper blade, wherein the opposing guide surfaces are convex with respect to the channel axis and diverge apart from one another away from the cutting zone so that the channel has a cross-sectional profile that receives tapered side walls of the wiper blade to maintain a substantially constant spatial relationship between the wiper blade and the body as the wiper blade travels through the channel along a cutting path; and a cutting blade mounted to the inclined surface of the cutting platform, the cutting blade having a sharp edge positioned across the channel at a predetermined depth within the channel and at an acute angle to the cutting path wherein the cutting blade slices material from the tip of the wiper blade as the body moves along the wiper blade.

2. The wiper reconditioning device of claim 1 wherein the body further comprises a flange projecting into the channel to be received and travel in a groove on a side of the wiper blade.

3. The wiper reconditioning device of claim 1 wherein the body further comprises opposing flanges projecting into the channel to be received and travel in opposing grooves on the wiper blade in a manner that prevents displacement between the wiper blade and the body.

4. The wiper reconditioning device of claim 1, further comprising a first removable guide member through which the channel extends, the first guide member being interchangeable with a second guide member through which another channel extends, the channel of the first and guide member having a first cross-sectional profile and the channel of the second guide member having a second cross-sectional profile different than that of the first guide member.

5. The wiper reconditioning device of claim 4 wherein the first guide member further comprises a pair of opposing flanges projecting into the channel of the first guide member, the opposing flanges being configured to be received to travel in opposing grooves on the wiper blade to prevent displacement between the wiper blade and the body.

6. The wiper reconditioning device of claim 1, further comprising a pair of opposing rollers mounted to the body, the rollers being positioned near an upper section of the channel to engage the tip of the wiper blade prior to the tip engaging the cutting blade.

7. The wiper reconditioning device of claim 1, further comprising an adjustable cutting blade assembly having a block positioned on the body and a moveable blade holder slideably connected to the block, the cutting blade being mounted to the blade holder, wherein the blade holder is moved with respect to the block to reposition the sharp edge of the cutting blade with respect to the channel.

8. The wiper reconditioning device of claim 7 wherein the block has a number of slots and the blade holder has a number of arms, each arm being received within a slot to guide the blade holder along the block.

9. A hand-held windshield wiper reconditioning device, comprising:

a body having a handle, a pair of spaced apart opposing guide surfaces extending along an axis through the body, and a pair of opposing flanges projecting inwardly from the guide surfaces, the guide surfaces and the flanges defining a channel in which the opposing guide surfaces are spaced apart from one another in a cutting zone to receive a tip of a wiper blade, wherein the opposing guide surfaces are convex with respect to the axis and diverge from one another away from the cutting zone to receive tapered side walls of the wiper blade, and wherein the flanges are configured to be received and travel in grooves along the wiper blade; and a cutting blade mounted to the body across the channel, the cutting blade having a sharp edge positioned at a predetermined depth in the channel to slice material from the tip of the wiper blade as the body moves along the wiper blade.

10. The wiper reconditioning device of claim 9, further comprising a first removable guide member through which the channel extends, the first guide member being interchangeable with a second guide member through which another channel extends, the channel of the first and guide member having a first cross-sectional profile and the channel of the second guide member having a second cross-sectional profile different than that of the first guide member.

11. The wiper reconditioning device of claim 9, further comprising a pair of opposing rollers mounted to the body, the rollers being positioned near an upper section of the channel to engage the tip of the wiper blade prior to the tip engaging the cutting blade.

12. The wiper reconditioning device of claim 9, further comprising an adjustable cutting blade assembly having a block positioned on the body and a moveable blade holder slideably connected to the block, the cutting blade being mounted to the blade holder, wherein the blade holder is moved with respect to the block to reposition the sharp edge of the cutting blade with respect to the channel.

13. The wiper reconditioning device of claim 12 wherein the block has a number of slots and the blade holder has a number of arms, each arm being received within a slot to guide the blade holder along the block.

* * * * *